(12) United States Patent
Hebenthal et al.

(10) Patent No.: US 11,797,849 B2
(45) Date of Patent: *Oct. 24, 2023

(54) SYSTEMS AND METHODS FOR ADAPTIVE TRAINING OF A MACHINE LEARNING SYSTEM PROCESSING TEXTUAL DATA

(71) Applicant: RELX Inc., Miamisburg, OH (US)

(72) Inventors: Douglas C. Hebenthal, Bellevue, WA (US); Cesare John Saretto, Greenbrier, TN (US); James Tracy, Murfreesboro, TN (US); Richard Clinkenbeard, Franklin, TN (US); Christopher Liu, Redmond, CA (US)

(73) Assignee: RELX INC., Miamisburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,385

(22) Filed: Sep. 12, 2022

(65) Prior Publication Data

US 2023/0004840 A1 Jan. 5, 2023

Related U.S. Application Data

(63) Continuation of application No. 16/838,527, filed on Apr. 2, 2020, now Pat. No. 11,475,329.

(Continued)

(51) Int. Cl.
*G06F 15/16* (2006.01)
*G06N 3/08* (2023.01)
(Continued)

(52) U.S. Cl.
CPC ........... *G06N 3/08* (2013.01); *G06F 18/2148* (2023.01); *G06F 18/2321* (2023.01); *G06N 5/04* (2013.01); *G06N 20/00* (2019.01)

(58) Field of Classification Search
CPC . G06N 3/08; G06N 20/00; G06N 5/04; G06F 18/2148; G06F 18/2321
(Continued)

(56) References Cited

U.S. PATENT DOCUMENTS

| 9,946,747 B2 | 4/2018 | Barker et al. |
| 10,354,544 B1 | 7/2019 | Chernin et al. |

(Continued)

FOREIGN PATENT DOCUMENTS

KR 1020180021444 A 3/2018

OTHER PUBLICATIONS

PCT/US2020/026564, Notification of Transmittal of the International Search Report and the Written Opinion of the International Searching Authority, or the Declaration, dated Jul. 22, 2020.

*Primary Examiner* — Moustafa M Meky
(74) *Attorney, Agent, or Firm* — DINSMORE & SHOHL LLP

(57) ABSTRACT

In one embodiment, a method for adaptive training of a machine learning system configured to predict answers to questions associated with textual data includes receiving predicted answers to questions associated with textual data. The predicted answers are generated based at least in part on one or more first models of a machine learning system. The one or more first models are associated with a first accuracy score. The method further includes determining based at least in part on a quality control parameter whether an evaluation of the questions by one or more external entities is required. In response to determining based at least in part on the quality control parameter that an evaluation of the questions by one or more external entities is required, the questions associated with the textual data and the textual data are sent to the one or more external entities for evaluation.

20 Claims, 6 Drawing Sheets

US 11,797,849 B2

Page 2

Related U.S. Application Data

(60) Provisional application No. 62/828,872, filed on Apr. 3, 2019.

(51) Int. Cl.
*G06N 5/04* (2023.01)
*G06N 20/00* (2019.01)
*G06F 18/214* (2023.01)
*G06F 18/2321* (2023.01)

(58) Field of Classification Search
USPC .......................................................... 709/200
See application file for complete search history.

(56) References Cited

U.S. PATENT DOCUMENTS

| | | | |
|---|---|---|---|
| 10,387,430 B2* | 8/2019 | Goth, III | G06N 5/022 |
| 10,430,426 B2 | 10/2019 | Byron et al. | |
| 10,540,967 B2* | 1/2020 | Perez | G06F 40/35 |
| 10,706,044 B2 | 7/2020 | Boguraev et al. | |
| 10,733,181 B2 | 8/2020 | Boguraev et al. | |
| 10,860,654 B2* | 12/2020 | Li | G06F 16/906 |
| 10,860,893 B2 | 12/2020 | Grindstaff et al. | |
| 10,963,779 B2* | 3/2021 | Le | G06N 3/08 |
| 11,164,473 B2 | 11/2021 | Byron et al. | |
| 11,379,736 B2* | 7/2022 | Trischler | G06F 40/279 |
| 11,475,329 B2* | 10/2022 | Hebenthal | G06F 18/2321 |
| 2013/0346351 A1 | 12/2013 | Lin et al. | |
| 2014/0297571 A1 | 10/2014 | Beamon et al. | |
| 2015/0227520 A1 | 8/2015 | Clark et al. | |
| 2016/0253596 A1* | 9/2016 | Goth, III | G09B 7/02 |
| | | | 706/12 |
| 2016/0293036 A1 | 10/2016 | Niemi et al. | |
| 2017/0140265 A1* | 5/2017 | Le | G06N 3/044 |
| 2017/0322939 A1 | 11/2017 | Byron et al. | |
| 2017/0337479 A1* | 11/2017 | Trischler | G06F 40/30 |
| 2018/0137854 A1* | 5/2018 | Perez | G06F 40/35 |
| 2018/0285691 A1 | 10/2018 | Grindstaff et al. | |
| 2019/0042988 A1 | 2/2019 | Brown et al. | |
| 2019/0102706 A1 | 4/2019 | Frank et al. | |
| 2019/0244127 A1 | 8/2019 | Amado et al. | |
| 2020/0159778 A1* | 5/2020 | Mohanty | G06Q 30/0282 |
| 2020/0257943 A1 | 8/2020 | Huber et al. | |
| 2020/0265735 A1 | 8/2020 | Byron et al. | |
| 2020/0311145 A1* | 10/2020 | Li | G06F 16/90332 |
| 2021/0019313 A1 | 1/2021 | Barker et al. | |
| 2021/0110211 A1 | 4/2021 | Grindstaff et al. | |

* cited by examiner

US 11,797,849 B2

SYSTEMS AND METHODS FOR ADAPTIVE TRAINING OF A MACHINE LEARNING SYSTEM PROCESSING TEXTUAL DATA

CROSS-REFERENCE TO RELATED APPLICATIONS

This application is a continuation of U.S. patent application Ser. No. 16/838,527 entitled "SYSTEMS AND METHODS FOR ADAPTIVE TRAINING OF A MACHINE LEARNING SYSTEM PROCESSING TEXTUAL DATA" and filed on Apr. 2, 2020, which claims priority to U.S. Provisional Patent Application No. 62/828,872 entitled "SYSTEMS AND METHODS FOR ADAPTIVE TRAINING OF A MACHINE LEARNING SYSTEM PROCESSING TEXTUAL DATA" and filed on Apr. 3, 2019, which are hereby incorporated by reference in their entireties.

BACKGROUND

Certain embodiments of the present invention are directed to machine learning systems processing textual data. More particularly, some embodiments of the present invention provide systems and methods for adaptive training of a machine learning system processing textual data.

With the demands on processing textual and natural language data ever increasing, machine learning systems are typically employed in analyzing and categorizing the textual and natural language data and other information included in large numbers of documents and files. Machine learning (ML) systems include prediction models that are generally trained based on currently known true answers up to a certain point in time. However, external factors can influence the accuracy of answers predicted by the conventional ML systems based on the trained models. Consequently, the actual accuracy of the predicted answers, for example, decreases over time, although the confidence in each predicted answer as calculated by the conventional ML systems remains high. Thus, conventional ML systems typically require, on a continuous basis, identifying inaccuracies of the predicted results, collecting additional data for training the models, and retraining the models. The continuous training of conventional ML system is labor intensive, time-consuming, and becomes more complex with the amount of training data increasing.

Hence it is highly desirable to provide and/or improve techniques for adaptive training of machine learning systems processing textual data.

SUMMARY

Certain embodiments of the present invention are directed to machine learning systems processing textual data. More particularly, some embodiments of the present invention provide systems and methods for adaptive training of a machine learning system processing textual data.

According to some embodiments, a method for adaptive training of a machine learning system configured to predict answers to questions associated with textual data includes receiving predicted answers to questions associated with textual data. The predicted answers are generated based at least in part on one or more first models of a machine learning system. The one or more first models are associated with a first accuracy score. The method further includes determining based at least in part on a quality control parameter whether an evaluation of the questions by one or more external entities is required. In response to determining based at least in part on the quality control parameter that an evaluation of the questions by one or more external entities is required, the questions associated with the textual data and the textual data are sent to the one or more external entities for evaluation. The method further includes receiving true answers to the questions from the one or more external entities and determining one or more accuracy parameters based at least in part on the true answers and the predicted answers. In response to the one or more accuracy parameters being smaller than a predetermined minimum threshold, an accuracy degradation event is identified, and the quality control parameter is increased. In response to a truth counter of at least one question being larger than a first predetermined truth threshold, one or more second models are generated, and a second accuracy score associated with the one or more second models is determined. In response to the second accuracy score being larger than the first accuracy score associated with the one or more first models, the one or more first models are replaced with the one or more second models at the machine learning system.

According to certain embodiments, a system for adaptive training of a machine learning system configured to predict answers to questions associated with textual data includes one or more processors and a memory storing instructions. The instructions, when executed by the one or more processors, cause the system to perform receiving predicted answers to questions associated with textual data. The predicted answers are generated based at least in part on one or more first models of a machine learning system. The one or more first models are associated with a first accuracy score. The instructions, when executed by the one or more processors, cause the system to further perform determining based at least in part on a quality control parameter whether an evaluation of the questions by one or more external entities is required. In response to determining based at least in part on the quality control parameter that an evaluation of the questions by one or more external entities is required, the questions associated with the textual data and the textual data are sent to the one or more external entities for evaluation. The instructions, when executed by the one or more processors, cause the system to further perform receiving true answers to the questions from the one or more external entities and determining one or more accuracy parameters based at least in part on the true answers and the predicted answers. In response to the one or more accuracy parameters being smaller than a predetermined minimum threshold, an accuracy degradation event is identified, and the quality control parameter is increased. In response to a truth counter of at least one question being larger than a first predetermined truth threshold, one or more second models are generated, and a second accuracy score associated with the one or more second models is determined. In response to the second accuracy score being larger than the first accuracy score associated with the one or more first models, the one or more first models are replaced with the one or more second models at the machine learning system.

According to some embodiments, a non-transitory computer readable storage medium storing one or more programs. The one or more programs includes instructions, when executed by one or more processors, causing a system for adaptive training of a machine learning system configured to predict answers to questions associated with textual data to perform receiving predicted answers to questions associated with textual data. The predicted answers are generated based at least in part on one or more first models of a machine learning system. The one or more first models are associated with a first accuracy score. The instructions, when executed by the one or more processors, cause the system to further perform determining based at least in part on a quality control parameter whether an evaluation of the questions by one or more external entities is required. In response to determining based at least in part on the quality control parameter that an evaluation of the questions by one or more external entities is required, the questions associated with the textual data and the textual data are sent to the one or more external entities for evaluation. The instructions, when executed by the one or more processors, cause the system to further perform receiving true answers to the questions from the one or more external entities and determining one or more accuracy parameters based at least in part on the true answers and the predicted answers. In response to the one or more accuracy parameters being smaller than a predetermined minimum threshold, an accuracy degradation event is identified, and the quality control parameter is increased. In response to a truth counter of at least one question being larger than a first predetermined truth threshold, one or more second models are generated, and a second accuracy score associated with the one or more second models is determined. In response to the second accuracy score being larger than the first accuracy score associated with the one or more first models, the one or more first models are replaced with the one or more second models at the machine learning system.

Depending upon embodiment, one or more benefits may be achieved. These benefits and various additional objects, features and advantages of the present invention can be fully appreciated with reference to the detailed description and accompanying drawings that follow.

DETAILED DESCRIPTION

Figure 1:
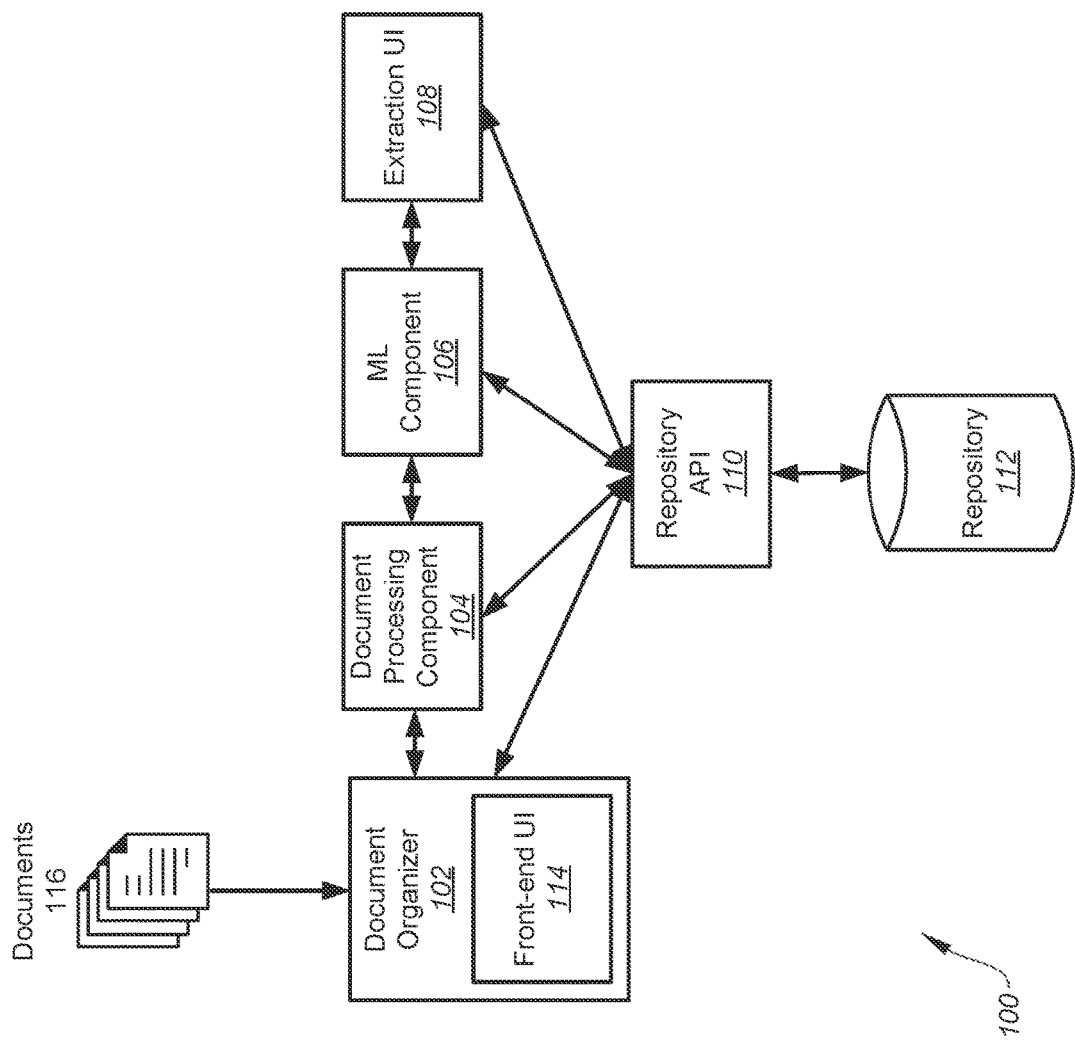
FIG. 1 is a simplified diagram showing a system for adaptive training of a machine learning system processing textual data according to one embodiment of the present invention.

Conventional systems and methods are often not capable of efficiently adapting to changes in external factors that influence the accuracy of results predicted by a machine learning (ML) system. Conventional systems and methods typically require continuous training of the ML system to account for such changes. In particular, conventional ML systems are trained on historical truths. Historical truths include, for example, actual results confirmed to be true by entities that are external to the ML system. Thus, conventional ML systems are continuously retrained, when new historical truths become available, to correct for the changes in external factors.

Certain embodiments of the present invention are directed to machine learning systems processing textual data. More particularly, some embodiments of the present invention provide systems and methods for adaptive training of a machine learning system processing textual data.

In some embodiments, the systems and methods provide for a machine learning system that automatically adapts to changes in external factors that can influence the accuracy of results predicted by the ML system. For example, predicted results include predictions about the content of contract documents written in natural languages. As an example, a conventional natural language processing algorithm is generally susceptible to inaccuracies when encountering language in documents that the algorithm has not previously seen nor been trained on.

In certain embodiments, inaccuracies in predicted results are improved upon by collecting additional truth samples and retraining the ML system without the need of creating new prediction algorithms. For example, truth samples include predicted results that were verified and/or corrected by external evaluation entities (e.g., by human experts). In some examples, the systems and methods are capable of spotting inaccuracies in the predicted results. For example, in response to spotting inaccuracies in the predicted results, inaccuracies are decreased by dynamically collecting additional truth samples from the external evaluation entities. As an example, in response to receiving additional truth samples, the ML system is automatically retrained after a predetermined truth interval. In one example, the predetermined truth interval represents a predetermined number of times when truth samples are received from the external evaluation entities. In some examples, new prediction models generated by retraining the ML system are promoted if the new models outperform the current prediction models of the ML system. For example, the new models outperform the current models if the accuracy of the new models is increased as compared to the accuracy of the current models based on the historical truth samples and/or the additional truth samples. In certain examples, the systems and methods include dynamically adjusting the requested number of additional truth samples based at least in part on accuracy of the current models.

Benefits of certain embodiments include that the automatic nature of retraining the ML system in predetermined truth intervals increases the speed of adaptation with respect to changing external factors and reduces the number of external evaluation. In some embodiments, other benefits include cost reduction with respect to employing human expert to evaluate the predicted results. In certain embodiments, additional benefits include that the decreased need and cost of employing specialized software engineer and/or data scientist to modify the ML algorithms for improved accuracy.

In certain embodiments, one or more solutions rooted in computer technology overcome one or more problems specifically arising in the realm of computer technology. Other embodiments included monitoring the accuracy determination of the ML system and, if certain criteria are met, raising an alert for intervention and/or improvement of the ML system. Yet another embodiment includes continuously training and generating new prediction models based at least in part on new truth samples that are requested at predetermined frequency intervals.

FIG. 1 is a simplified diagram showing a system 100 for adaptive training of a machine learning system processing textual data according to one embodiment of the present invention. This diagram is merely an example, which should not unduly limit the scope of the claims. One of ordinary skill in the art would recognize many variations, alternatives, and modifications. The system 100 includes a document organizer component 102, a document processing component 104, a machine learning component 106, an extraction user interface (UI) component 108, a repository API component 110, and a repository 112. For example, the document organizer component 102 includes a front-end UI component 114 and is configured to organize, categorize, and select documents 116 for storing in the repository 112, and/or further managing and analyzing the documents 116 by the system 100. As an example, the document processing component 104 is included in the repository API component 110.

In some embodiments, documents 116 include textual data and/or content written in natural languages. Examples of documents 116 include contracts, patent licenses, trademark licenses, copyright licenses, technology licenses, joint ventures agreements, confidentiality agreements, research agreements, material supply agreements, manufacturing agreements, statements of work, and amendments and addenda of the forgoing documents. In certain examples, the repository API component 110 is configured to receive data from the document organizer component 102, the document processing component 104, the machine learning component 106, and/or the extraction UI component 108, and store the received data in the repository 112. In other examples, the extraction UI component provides a user interface configured for users to interact with data and documents received from the document organizer component 102, the document processing component 104, the machine learning component 106, and/or the repository API component 110. In some examples, the user interface of the extraction UI component is configured to allow users to interact with data and documents stored in the repository 112.

In certain embodiments, the document processing component 104 is configured to receive data associated with the documents 116 from the document organizer component 102 for further processing. In some examples, the processing by the document processing component 104 includes, for example, applying optical character recognition techniques to the received data of the documents 116. As an example, the document processing component 104 is configured to parse the received data to identify, classify, and mark particular sections within the documents 116. In certain examples, the document processing component 104 is configured to add metadata to the documents 116 based at least in part on the processing of the documents 116. In other examples, the document processing component 104 is configured to convert between formats and/or presentation styles of the data associated with the documents 116, and, for example, generate formatted documents of the converted data. In yet other examples, the document processing component 104 is configured to generate reports, annotations and/or documentations of the processed documents 116.

Figure 2:
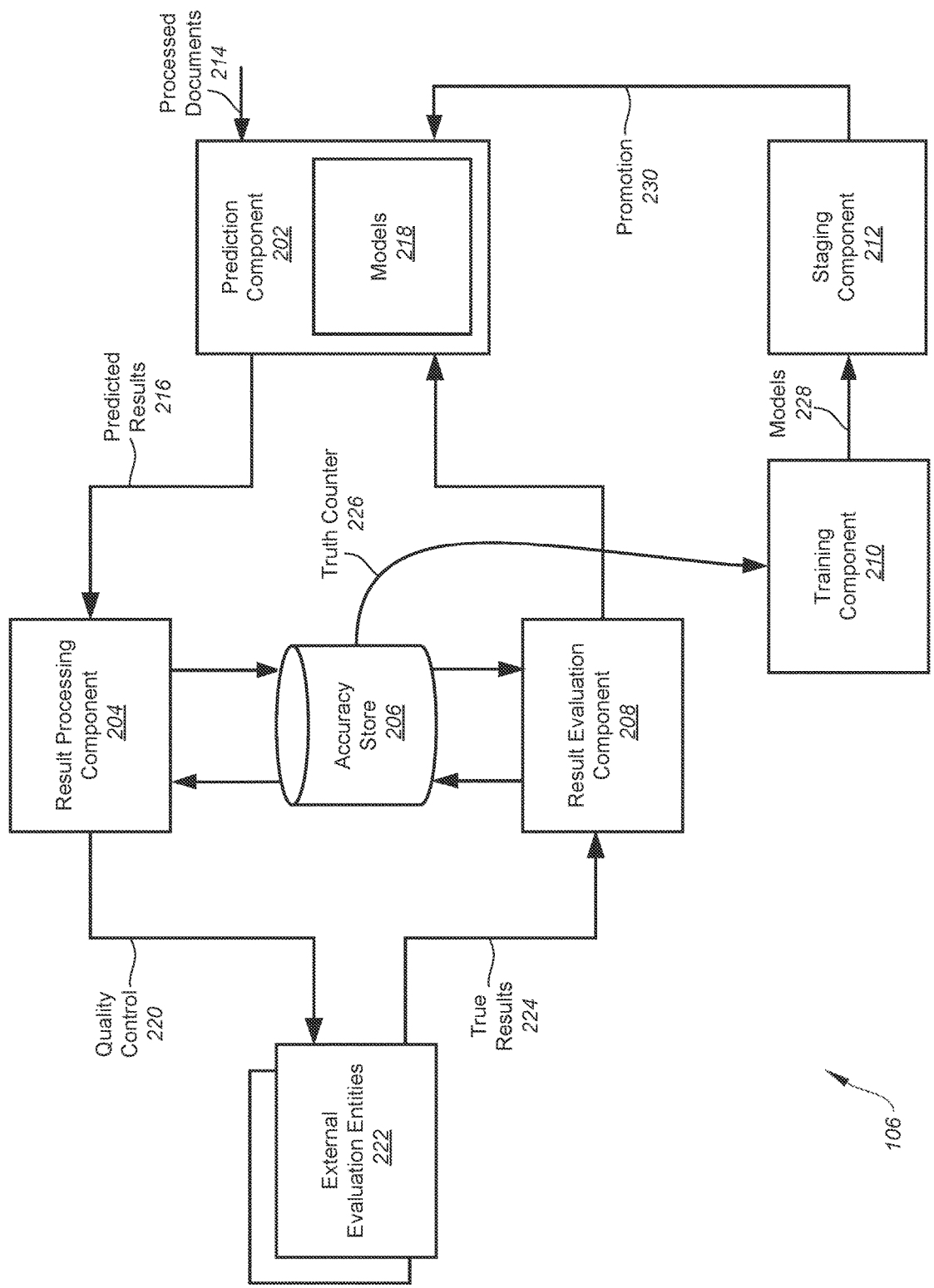
FIG. 2 is a simplified diagram showing the machine learning component as part of the system as shown in FIG. 1 according to one embodiment of the present invention.

FIG. 2 is a simplified diagram showing the machine learning component 106 as part of the system 100 according to one embodiment of the present invention. This diagram is merely an example, which should not unduly limit the scope of the claims. One of ordinary skill in the art would recognize many variations, alternatives, and modifications. The machine learning component 106 includes a prediction component 202, a result processing component 204, an accuracy store 206, a result evaluation component 208, a training component 210, and a staging component 212. In some examples, the prediction component 202 is configured to receive documents 214 processed by the system 100. For example, the processed documents 214 include textual data.

In some embodiments, the prediction component 202 is configured to generate the predicted results 216 based at least in part on one or more models 218 of the machine learning system. For example, the predicted results include predicted answers to questions associated with textual data of the processed documents 214. In some examples, the prediction component 202 is configured to generate predicted answers to questions associated with textual data of the processed documents 214. In certain examples, the prediction component 202 is configured to generate a goodness, a predictive error, a robustness value, and/or an confidence score associated with the predicted answer based at least in part on the one or more models 218 of the machine learning system. For example, the one or more models 218 are associated with an accuracy score. As an example, the one or more models 218 are generated by using supervised, semi-supervised and/or unsupervised machine learning techniques. In some examples, the machine learning techniques include neural networks, feature selection and classification, rule-based learning, and/or similarity measure techniques.

In certain embodiments, the result processing component 204 is configured to receive the predicted results 216. For example, the predicted results 216 include predicted answers to questions associated with textual data of the processed documents 214. As an example, the predicted answers to questions associated with textual data are received by the result processing component 204 in response to a request or push event.

According to some embodiments, the result processing component 204 is configured to determine based at least in part on a quality control parameter whether an evaluation of the predicted results by one or more external entities 222 is required. In some examples, the result processing component 204 is configured to determine that an evaluation of the predicted results is required if the quality control parameter is equal to or smaller than a predetermined quality threshold. For example, predetermined quality threshold is 10%, 20%, 30%, 40%, or 50%.

According to certain embodiments, the quality control parameter includes a number of required evaluations performed by the one or more external entities 222. In some examples, the result processing component 204 is configured to not determine whether an evaluation by the one or more external entities 222 is required until receiving a predetermined minimum number of truth samples. For example, the predetermined minimum number is based on the type, load and/or set of processed documents 214. As an example, the predetermined minimum number is equal to 100, 200, 300, 400, or 500 truth samples.

In some embodiments, the result processing component 204 is configured to generate the quality control parameter based at least in part on one or more factors. Examples of the one or more factors include one or more static configuration parameters associated with the textual data, a current environment associated with the textual data, an identity of a requester associated with a request, a confidence associated with the predicated answers, and/or a request frequency. In some examples, the quality control parameter includes a Boolean parameter. For example, the Boolean parameter (e.g., requiresEvaluation) is determined as follows:

$$requiresEvaluation = \quad \text{(Equation 1)}$$
$$fieldBase + environmentConfig + identityScore +$$
$$(dataSetSampleCount < dataSetMinSample) \cdot 100 +$$
$$(confidence < dataSetMinConf) \cdot 100 +$$
$$(hasActiveEvent \cdot accuracyScaleSetting) < Random,$$

where fieldBase represents a minimum value of prediction evaluations, environmentConfig represents a weighted value based on environmental parameters (e.g., region, date, time of day), identityScore represents a weighted value based on the requester identify (e.g., uploader, customer, project), dataSetSampleCount represents a number of samples collected for a given customer, dataSetMinSample represents a minimum number of samples required to be collected prior to training of the ML system and generating predicted results for a new customer, confidence represents confidence associated with the predicted results generated by the prediction component 202, dataSetMinConf represents a minimum confidence required for the predicted results to bypass evaluation by one or more external entities 222, hasActiveEvent represents a Boolean value for an active accuracy degradation event, accuracyScaleSetting represents a percentage number of evaluations required for an auto-scaling event, and Random represents a random number in the range 0 to 1.

In certain embodiments, the result processing component 204 is configured, in response to determining based at least in part on the quality control parameter that an evaluation by one or more external entities is required, send the questions associated with the textual data and the textual data of the processed documents 214 to the external evaluation entities 222 for evaluation.

According to some embodiments, the external evaluation entities 222 are configured to evaluate the questions associated with textual data and the textual data of the processed documents 214. In some examples, the external entities 222 are configured to generate true results 224 based at least in part on the textual data of the processed documents 214. In certain examples, the external entities 222 are configured to generate true answers to the questions based at least in part on the textual data of the processed documents 214. For example, the external entities 222 are configured to evaluate the questions based on the textual data through a mechanical evaluation, a virtual evaluation, and/or a natural evaluation. In one example, the external entities 222 include humans who review the questions and provide true answers to the reviewed questions based on the textual data of the processed documents 214. In other examples, the external entities 222 include virtual evaluation systems configured to generate true answers for certain questions based at least in part on criteria and/or features of the textual data of the processed documents 214. In some examples, the external entities 222 are configured to evaluate the questions based on the textual data of the processed documents 214 without knowledge of the predicted answers generated by the prediction component 202.

According to certain embodiments, the result evaluation component 208 is configured to receive the true results 224 from the external evaluation entities 222. In some examples, the result evaluation component 208 is configured to receive the true answers generated by the external evaluation entities 220. In certain examples, the result evaluation component 208 is configured to determine one or more accuracy parameters based at least in part on the true answers generated by the external evaluation entities 222 and the predicted answers generated by the prediction component 202. In some examples, the result processing component 204 is configured to increase the number of required evaluations based at least in part on the one or more accuracy parameters determined by the result evaluation component 208. In other examples, the result evaluation component 208 is configured to store the determined one or more accuracy parameters in the accuracy store 206 for retrieval by the machine learning system. For example, the result evaluation component 208 is configured to store an accuracy deviation in the accuracy store 206 for retrieval by the machine learning system. As an example, the accuracy deviation is equal to a difference of the one or more accuracy parameters and a predetermined minimum threshold.

In some embodiments, the result evaluation component 208 is configured to, in response to the one or more accuracy parameters being smaller than the predetermined minimum threshold, identify an accuracy degradation event. For example, the predetermined minimum threshold represents an accuracy threshold. In some examples, the accuracy degradation event is triggered if the one or more accuracy parameters fall below the predetermined minimum threshold. For example, the predetermined minimum threshold represents a user-specified minimum value of accuracy. In certain examples, the result evaluation component 208 is configured to increase the predetermined minimum threshold in response to the accuracy score of the models 218 increasing over time.

Figure 3:
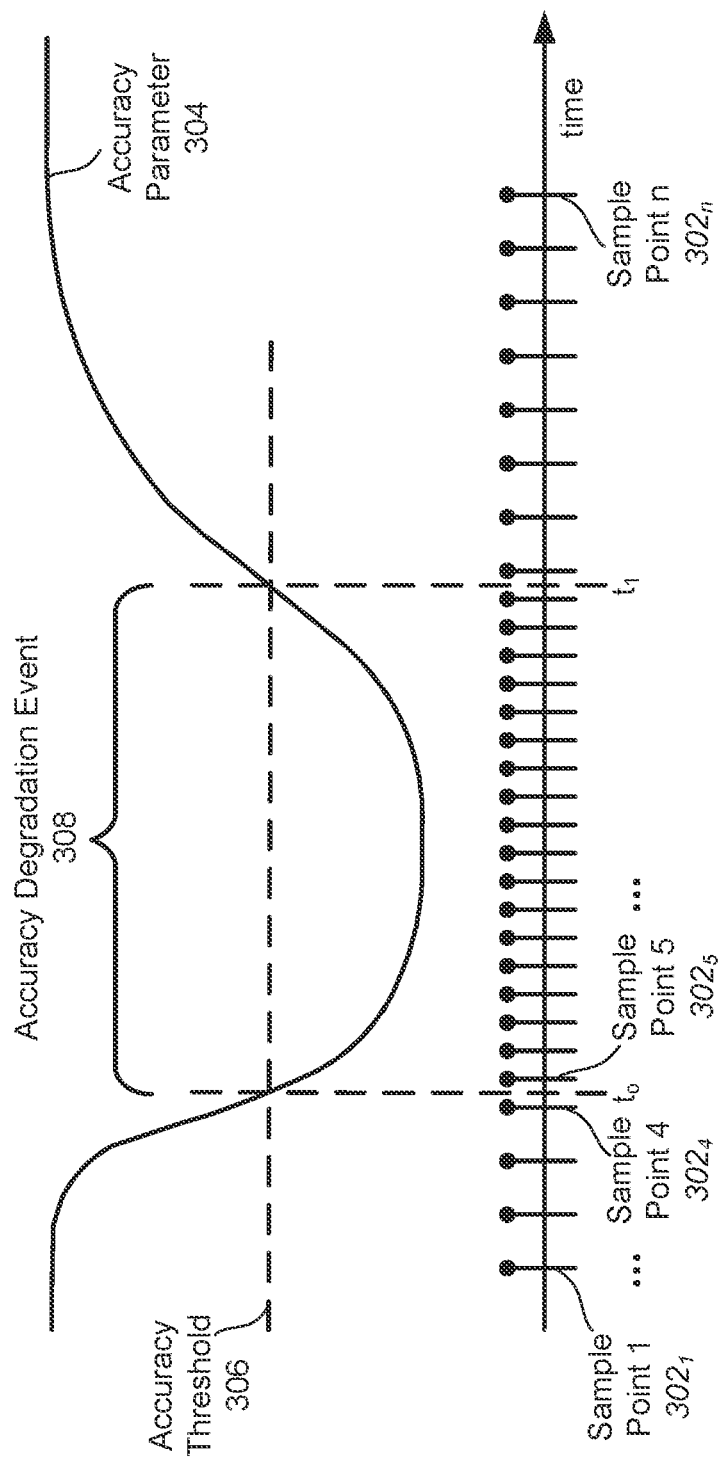
FIG. 3 is a simplified timing diagram for the result evaluation component as shown in FIG. 2 according to one embodiment of the present invention.

FIG. 3 is a simplified timing diagram for the result evaluation component 208 according to one embodiment of the present invention. This diagram is merely an example, which should not unduly limit the scope of the claims. One of ordinary skill in the art would recognize many variations, alternatives, and modifications. In some examples, the result evaluation component 208 receives true results from the external evaluation entities 222 at sample points $302_{1-n}$. For example, at sample points $302_{1-n}$ the result evaluation component 208 determines the accuracy parameter 304. As an example, the result evaluation component 208 determines that the accuracy parameter 304 at sample points $302_{1-4}$ (e.g., at sample points 1-4) is larger than the accuracy threshold 306. In another example, the result evaluation component 208 determines that the accuracy parameter 304 at sample point $302_5$ (e.g., at sample point 5) is smaller than the accuracy threshold 306. In yet another example, the result evaluation component 208 determines that between the sample point $302_4$ and the sample point $302_5$ (e.g., between sample point 4 and sample point 5) the accuracy parameter changes from a value that is larger than the accuracy threshold 306 to a value that is smaller the accuracy threshold 306. In certain examples, the result evaluation component 208 determines that the accuracy parameter 304 at time $t_0$ is equal to the accuracy threshold 306. For example, the result evaluation component 208 determines that the accuracy parameter changes from a value that is larger than the accuracy threshold 306 at a time prior to time $t_0$ to a value that is smaller the accuracy threshold 306 at time after time $t_0$. As an example, the result evaluation component 208, in response to the accuracy parameter 304 being smaller than the accuracy threshold 306, identifies the accuracy degradation event 308. In one example, the accuracy degradation event 308 starts at time $t_0$. In some examples, the result evaluation component 208 determines that the accuracy parameter 304 at time $t_1$ is equal to the accuracy threshold 306. For example, the result evaluation component 208 determines that the accuracy parameter changes from a value that is smaller than the accuracy threshold 306 at a time prior to time $t_1$ to a value that is larger the accuracy threshold 306 at time after time $t_1$. As an example, the result evaluation component 208, in response to the accuracy parameter 304 being larger than the accuracy threshold 306, clears the accuracy degradation event 308. In one example, the accuracy degradation event 308 ends at the time $t_1$. In another example, the result evaluation component 208, in response to the accuracy parameter 304 being larger than the accuracy threshold 306 over a rolling accuracy window (e.g., over a predetermined number of samples or a predetermined time duration), clears the accuracy degradation event 308.

In some embodiments, the result evaluation component 208 is configured to, in response to the one or more accuracy parameters being equal to or larger than the predetermined minimum threshold, clear the identified accuracy degradation event 308. In some examples, in response to the accuracy degradation event 308 being cleared, the result evaluation component 208 is configured to determine an evaluation number that indicates the number of evaluations performed by the external evaluation entities 222. For example, the evaluation number is equal to the number of sample points 302 for the duration of the accuracy degradation event 308. As an example, the result evaluation component 208 is configured to store the evaluation number and the truth counter 226 in the accuracy store 206 for retrieval by the machine learning system. In one example, the result evaluation component 208 is configured to store the truth counter 226 if the accuracy degradation event 308 is cleared. For example, the result evaluation component 208 is configured to set the value of hasActiveEvent in Equation 1 to zero if the accuracy degradation event 308 is cleared. In some examples, the result evaluation component 208 is configured to store the truth counter 226 in the accuracy store 206 in response to identifying the accuracy degradation event 308.

In certain embodiments, the number of sample points 302 for the duration of the accuracy degradation event 308 is equal to the number of results received from the external evaluation entities 222 at sample points 302 after time $t_0$ and before time $t_1$. In some examples, in response to the accuracy degradation event 308 being identified by the result evaluation component 208, the result processing component 204 is configured to change the quality control parameter so that the frequency of required evaluations by the external evaluation entities 222 is increased. For example, in response to increasing the frequency of required evaluations, the number of sample points 302 increases in magnitude for the duration of the accuracy degradation event 308. In certain examples, in response to the accuracy degradation event 308 being cleared by the result evaluation component 208, the result processing component 204 is configured to change the quality control parameter so that the frequency of required evaluations by the external evaluation entities 222 is decreased. For example, in response to decreasing the frequency of required evaluations, the number of sample points 302 decreases in magnitude outside the accuracy degradation event 308.

Referring to FIG. 2, in certain embodiments, the result evaluation component 208 is configured, in response to the one or more accuracy parameters being smaller than a predetermined minimum threshold, increase the truth counter 226. For example, the result evaluation component 208 is configured to increase the truth counter 226 for each question associated with textual data of the processed documents 214. As an example, in response to identifying an accuracy degradation event, the result evaluation component 208 is configured to store the truth counter 226 in the accuracy store 206. In some examples, the result evaluation component 208 is configured to determine based at least in part on the quality control parameter whether an evaluation of the questions by the external evaluation entities 222 is required until the accuracy degradation event is cleared. For example, the result evaluation component 208 is configured to clear the accuracy degradation event if the one or more accuracy parameters are equal to or larger than the predetermined minimum threshold. In certain examples, the result processing component 204 is configured to increase the quality control parameter.

According to some embodiments, the training component 210 is configured to, in response to the truth counter 224 of at least one question being larger than a predetermined truth threshold, generate one or more models 228 of the machine learning system. For example, the predetermined truth threshold is equal to 500, 1,000, 1,500 or 2,000. In some examples, the training component 210 is configured to generate models 228 of the machine learning system by training the models 228 using training data and known true answers associated with the training data. For example, in response to training the models based at least in part on training data and known true answers associated with the training data, the prediction component 202 is configured to predict answers to the questions on non-training data using the trained models. As an example, the training component 210 is configured to generate one or more models 228 by training the one or more models 228 based at least in part on one or more combinations of truth data. In one example, the truth data includes the true answers and the textual data associated with the true answers. In certain examples, the one or more combinations of truth data include truth data generated after the accuracy degradation event 308 is identified by the result evaluation component 208. In other examples, the one or more combinations of truth data include truth data generated before and after the accuracy degradation event 308 is identified. In other examples, the training component 210 is configured to send the one or more models 228 to the staging component 212. For example, the staging component 212 is configured to receive the one or more models 228 from the training component 210 to determine an accuracy score of the one or more models 228.

According to certain embodiments, the staging component 212 is configured to determine an accuracy score associated with the one or more models 228. For example, the staging component 212 is configured to determine accuracy scores for each model of the one or more models 228 based on the truth data. In some examples, the staging component 212 is configured to, in response to the accuracy score of the models 228 being larger than the accuracy score associated with the models 218, replace the one or more models 218 with the one or more models 228 at the prediction component 202 of the machine learning system. For example, the accuracy score of the models 228 is larger than the accuracy score of the models 218 if the accuracy score of each model of the models 228 is larger than the accuracy score of each model of the models 218. In certain examples, the staging component 212 is configured to promote the models 228 to the prediction component 202 if the accuracy score of the models 228 is larger than the accuracy score of the models 218. According to some examples, the staging component 212 is configured to, in response to the accuracy score of models 228 being smaller than or equal to the accuracy score of models 218, wait for the truth counter to increase further. For example, the staging component 212 is configured to, in response to the truth counter being larger than a predetermined truth threshold, generate the one or more models 228, and determine the accuracy score associated with the one or more models 228.

Figure 4A:
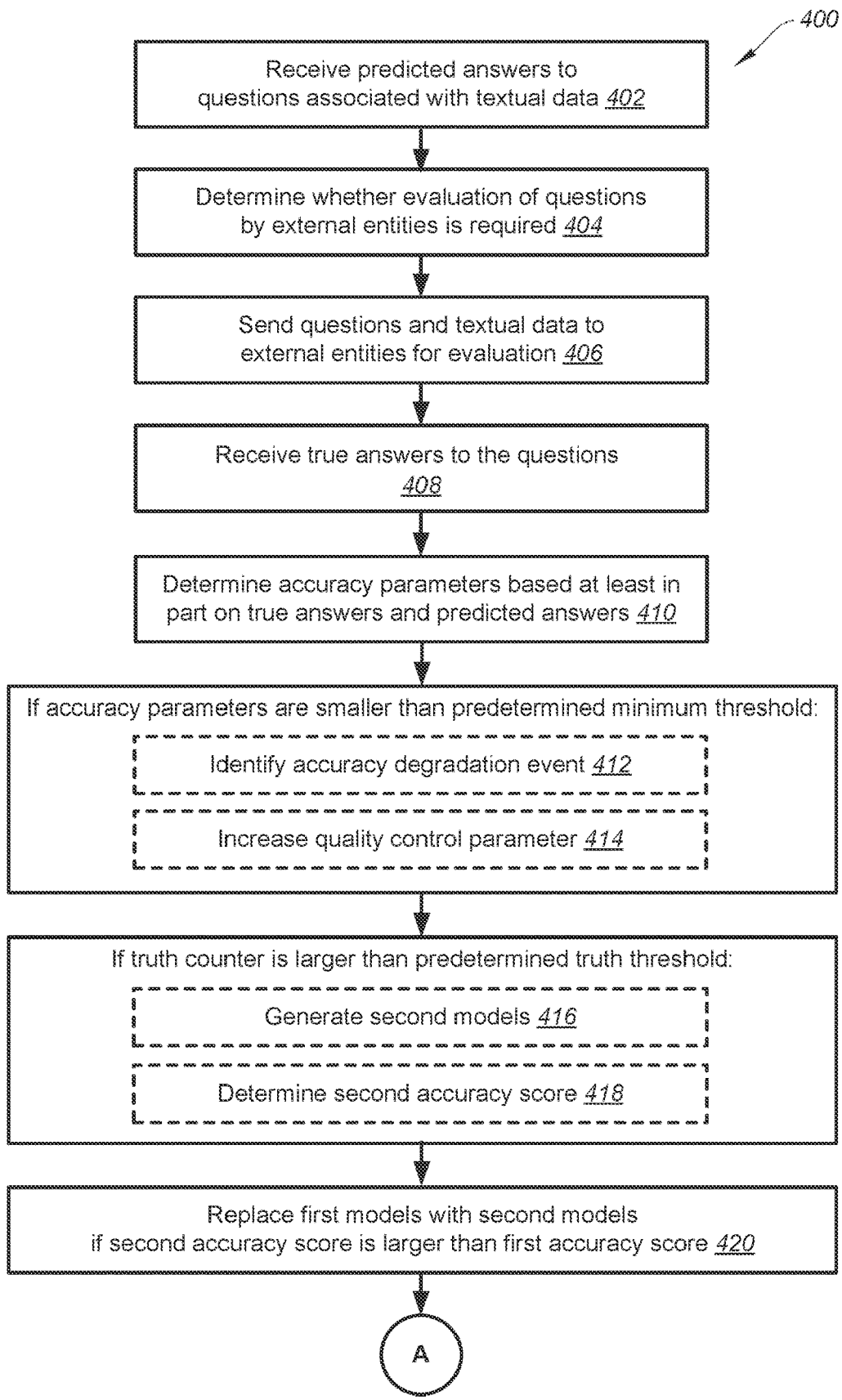
FIG. 4A is a simplified diagram showing a method for adaptive training of a machine learning system processing textual data according to one embodiment of the present invention.

FIG. 4A is a simplified diagram showing a method for adaptive training of a machine learning system processing textual data according to one embodiment of the present invention. This diagram is merely an example, which should not unduly limit the scope of the claims. One of ordinary skill in the art would recognize many variations, alternatives, and modifications. The method 400 includes processes 402-420 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 400 are performed by the system 100. In certain examples, some or all processes (e.g., steps) of the method 400 are performed by a computer and/or a processor directed by a code. For example, a computer includes a server computer and/or a client computer (e.g., a personal computer). In some examples, some or all processes (e.g., steps) of the method 400 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 402, a predicted answers to questions associated with textual data is received. The predicted answers is generated based at least in part on one or more first models of a machine learning system. The one or more first models are associated with a first accuracy score. At the process 404, whether an evaluation of the questions by one or more external entities is required is determined based at least in part on a quality control parameter. At process 406, in response to determining based at least in part on the quality control parameter that an evaluation of the questions by one or more external entities is required, the questions associated with the textual data and the textual data are sent to the one or more external entities for evaluation. At process 408, true answers to the questions from the one or more external entities are received. One or more accuracy parameters based at least in part on the true answers and the predicted answers are determined at process 410. In response to the one or more accuracy parameters being smaller than a predetermined minimum threshold, an accuracy degradation event is identified at process 412, and the quality control parameter is increased at process 414. In response to a truth counter of at least one question being larger than a first predetermined truth threshold, one or more second models are generated at process 416, and a second accuracy score associated with the one or more second models is determined at process 418. At process 420, in response to the second accuracy score being larger than the first accuracy score associated with the one or more first models, the one or more first models with the one or more second models are replaced at the machine learning system.

Figure 4B:
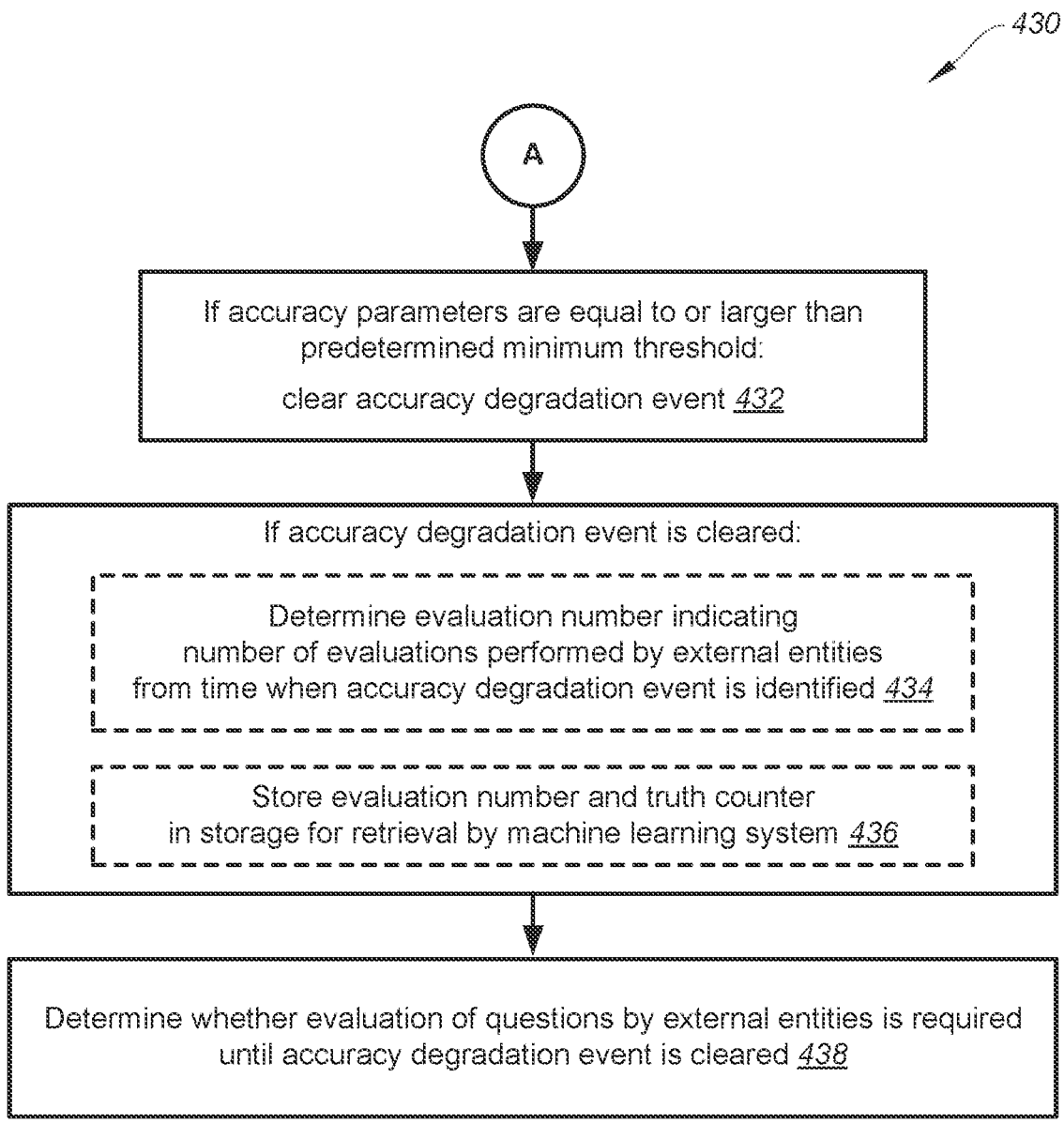
FIG. 4B is a simplified diagram showing a method for adaptive training of a machine learning system processing textual data according to one embodiment of the present invention.

FIG. 4B is a simplified diagram showing a method for adaptive training of a machine learning system processing textual data according to one embodiment of the present invention. This diagram is merely an example, which should not unduly limit the scope of the claims. One of ordinary skill in the art would recognize many variations, alternatives, and modifications. In addition to the processes 402-420, as shown in FIG. 4A, the method 430 further includes processes 432-438 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 430 are performed by the system 100. In certain examples, some or all processes (e.g., steps) of the method 430 are performed by a computer and/or a processor directed by a code. For example, a computer includes a server computer and/or a client computer (e.g., a personal computer). In some examples, some or all processes (e.g., steps) of the method 430 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 432, in response to the one or more accuracy parameters being equal to or larger than the predetermined minimum threshold, the accuracy degradation event is cleared. For example, in response to the accuracy degradation event being cleared, an evaluation number is determined at the process 434, and, at the process 436, the evaluation number and the truth counter is stored in a storage for retrieval by the machine learning system. The evaluation number indicates a number of evaluations performed by one or more external entities from a time when the accuracy degradation event is identified. At the process 438, whether an evaluation of the questions by one or more external entities is required is determined based at least in part on a quality control parameter until the accuracy degradation event is cleared.

Figure 5:
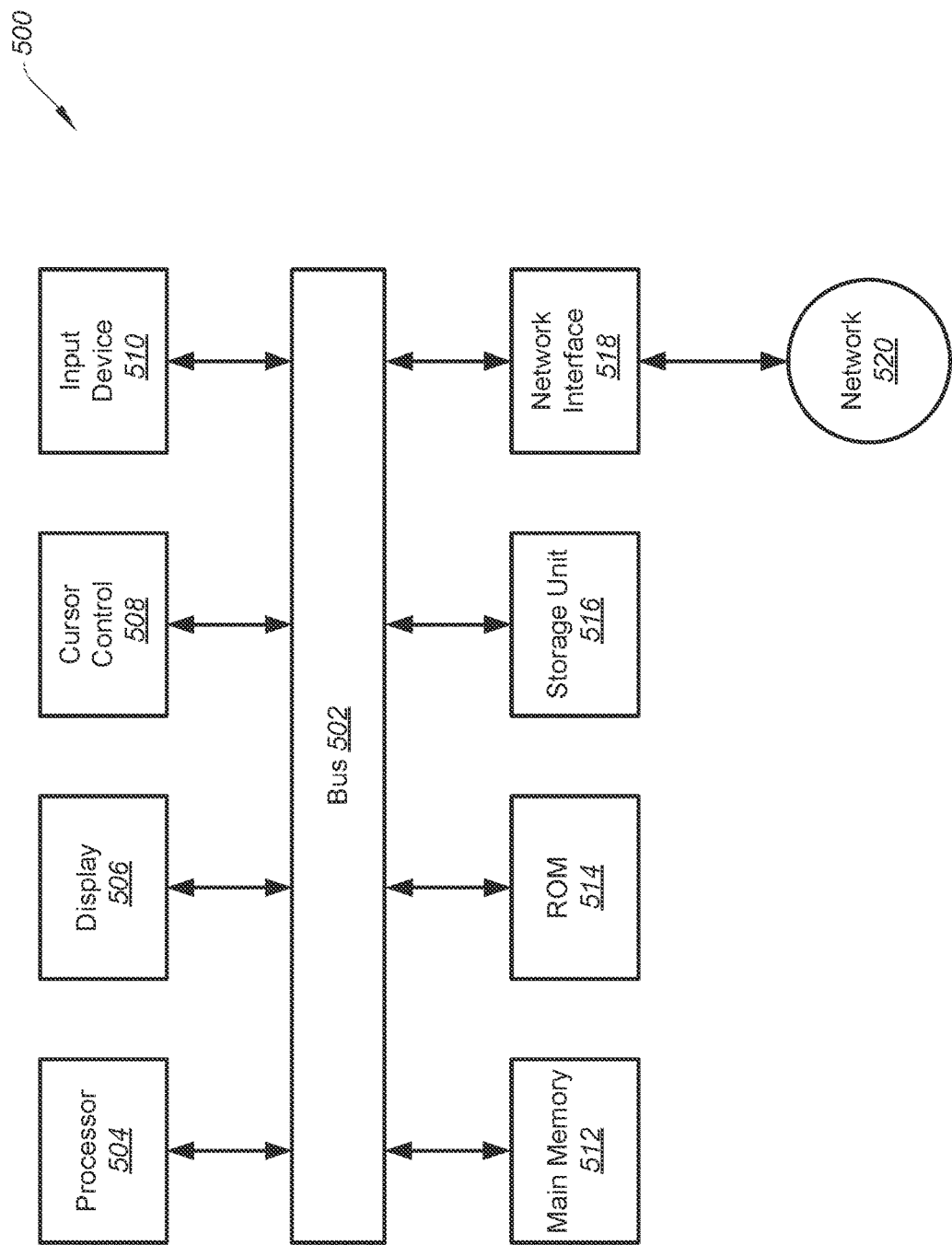
FIG. 5 is a simplified diagram showing a computing system for implementing a system for adaptive training of a machine learning system processing textual data according to one embodiment of the present invention.

FIG. 5 is a simplified diagram showing a computing system for implementing a system for adaptive training of a machine learning system processing textual data according to one embodiment of the present invention. This diagram is merely an example, which should not unduly limit the scope of the claims. One of ordinary skill in the art would recognize many variations, alternatives, and modifications. The computing system 500 includes a bus 502 or other communication mechanism for communicating information, a processor 504, a display 506, a cursor control component 508, an input device 510, a main memory 512, a read only memory (ROM) 514, a storage unit 516, and a network interface 518. In some embodiments, some or all processes (e.g., steps) of the method 400 are performed by the computing system 500. In some examples, the bus 502 is coupled to the processor 504, the display 506, the cursor control component 508, the input device 510, the main memory 512, the read only memory (ROM) 514, the storage unit 516, and/or the network interface 518. In certain examples, the network interface is coupled to a network 520. For example, the processor 504 includes one or more general purpose microprocessors. In some examples, the main memory 512 (e.g., random access memory (RAM), cache and/or other dynamic storage devices) is configured to store information and instructions to be executed by the processor 504. In certain examples, the main memory 512 is configured to store temporary variables or other intermediate information during execution of instructions to be executed by processor 504. For examples, the instructions, when stored in the storage unit 516 accessible to processor 504, render the computing system 500 into a special-purpose machine that is customized to perform the operations specified in the instructions. In some examples, the ROM 514 is configured to store static information and instructions for the processor 504. In certain examples, the storage unit 516 (e.g., a magnetic disk, optical disk, or flash drive) is configured to store information and instructions.

In some embodiments, the display 506 (e.g., a cathode ray tube (CRT), an LCD display, or a touch screen) is configured to display information to a user of the computing system 500. In some examples, the input device 510 (e.g., alphanumeric and other keys) is configured to communicate information and commands to the processor 504. For example, the cursor control 508 (e.g., a mouse, a trackball, or cursor direction keys) is configured to communicate additional information and commands (e.g., to control cursor movements on the display 506) to the processor 504.

According to some embodiments, a method for adaptive training of a machine learning system configured to predict answers to questions associated with textual data includes receiving predicted answers to questions associated with textual data. The predicted answers are generated based at least in part on one or more first models of a machine learning system. The one or more first models are associated with a first accuracy score. The method further includes determining based at least in part on a quality control parameter whether an evaluation of the questions by one or more external entities is required. In response to determining based at least in part on the quality control parameter that an evaluation of the questions by one or more external entities is required, the questions associated with the textual data and the textual data are sent to the one or more external entities for evaluation. The method further includes receiving true answers to the questions from the one or more external entities and determining one or more accuracy parameters based at least in part on the true answers and the predicted answers. In response to the one or more accuracy parameters being smaller than a predetermined minimum threshold, an accuracy degradation event is identified, and the quality control parameter is increased. In response to a truth counter of at least one question being larger than a first predetermined truth threshold, one or more second models are generated, and a second accuracy score associated with the one or more second models is determined. In response to the second accuracy score being larger than the first accuracy score associated with the one or more first models, the one or more first models are replaced with the one or more second models at the machine learning system. For example, the method is implemented according to at least FIG. 1, FIG. 2, and/or FIG. 3.

In some examples, the quality control parameter indicates a number of required evaluations performed by the one or more external entities. In certain examples, the determining based at least in part on a quality control parameter whether an evaluation of the questions by one or more external entities is required includes increasing the number of required evaluations based at least in part on the determined one or more accuracy parameters.

In other examples, the generating one or more second models includes training the one or more second models based at least in part on one or more combinations of truth data. The truth data includes the true answers and the textual data associated with the true answers. For example, one or more combinations of truth data include truth data generated after the accuracy degradation event is identified. As an example, one or more combinations of truth data include truth data generated before and after the accuracy degradation event is identified. In some examples, the determining a second accuracy score associated with the one or more second models includes determining accuracy scores for each model of the one or more second model based on the truth data.

In some examples, the second accuracy score is larger than the first accuracy score if an accuracy score of each model of the one or more second models is larger than an accuracy score of each model of the one or more first models. In certain examples, the method further includes, in response to the second accuracy score being smaller than or equal to the first accuracy score, waiting for the truth counter to increase further. In response to the second accuracy score being smaller than or equal to the first accuracy score, the one or more second models is generated, and the second accuracy score associated with the one or more second models is determined. In other examples, the method further includes determining based at least in part on a quality control parameter whether an evaluation of the questions by one or more external entities is required until the accuracy degradation event is cleared.

In certain examples, the method further includes, in response to the one or more accuracy parameters being equal to or larger than the predetermined minimum threshold, clearing the accuracy degradation event. For example, the predicted answers to questions associated with textual data are received in response to a request or push event. In some examples, the method further includes generating the quality control parameter based at least in part on one or more factors. The one or more factors include one or more static configuration parameters associated with the textual data, a current environment associated with the textual data, an identity of a requester associated with the request, a confidence associated with the predicated answers, and a request frequency. In other examples, the receiving true answers to the questions from the one or more external entities includes evaluating the questions based on the textual data by the one or more external entities through a mechanical evaluation, a virtual evaluation, or a natural evaluation.

In some examples, the questions based on the textual data are evaluated by the one or more external entities without knowledge of the predicted answers. In other examples, the method further includes storing the determined one or more accuracy parameters in a storage for retrieval by the machine learning system. For example, the method further includes storing an accuracy deviation in the storage for retrieval by the machine learning system. The accuracy deviation is equal to a difference of the one or more accuracy parameters and the predetermined minimum threshold. In certain examples, the method further includes, in response to the accuracy degradation event being cleared, determining an evaluation number. The evaluation number indicates a number of evaluations performed by one or more external entities from a time when the accuracy degradation event is identified. In response to the accuracy degradation event being cleared, the evaluation number and the truth counter is stored in a storage for retrieval by the machine learning system.

In other examples, the method further includes, in response to the identifying an accuracy degradation event, storing the truth counter in a storage for retrieval by the machine learning system. For example, the method further includes increasing the predetermined minimum threshold in response to the first accuracy score increasing over time.

According to certain embodiments, a system for adaptive training of a machine learning system configured to predict answers to questions associated with textual data includes one or more processors and a memory storing instructions. The instructions, when executed by the one or more processors, cause the system to perform receiving predicted answers to questions associated with textual data. The predicted answers are generated based at least in part on one or more first models of a machine learning system. The one or more first models are associated with a first accuracy score. The instructions, when executed by the one or more processors, cause the system to further perform determining based at least in part on a quality control parameter whether an evaluation of the questions by one or more external entities is required. In response to determining based at least in part on the quality control parameter that an evaluation of the questions by one or more external entities is required, the questions associated with the textual data and the textual data are sent to the one or more external entities for evaluation. The instructions, when executed by the one or more processors, cause the system to further perform receiving true answers to the questions from the one or more external entities and determining one or more accuracy parameters based at least in part on the true answers and the predicted answers. In response to the one or more accuracy parameters being smaller than a predetermined minimum threshold, an accuracy degradation event is identified, and the quality control parameter is increased. In response to a truth counter of at least one question being larger than a first predetermined truth threshold, one or more second models are generated, and a second accuracy score associated with the one or more second models is determined. In response to the second accuracy score being larger than the first accuracy score associated with the one or more first models, the one or more first models are replaced with the one or more second models at the machine learning system. For example, the system is implemented according to at least FIG. 1, FIG. 2, and/or FIG. 3.

In some examples, the quality control parameter indicates a number of required evaluations performed by the one or more external entities. In certain examples, the determining based at least in part on a quality control parameter whether an evaluation of the questions by one or more external entities is required includes increasing the number of required evaluations based at least in part on the determined one or more accuracy parameters.

In other examples, the generating one or more second models includes training the one or more second models based at least in part on one or more combinations of truth data. The truth data includes the true answers and the textual data associated with the true answers. For example, one or more combinations of truth data include truth data generated after the accuracy degradation event is identified. As an example, one or more combinations of truth data include truth data generated before and after the accuracy degradation event is identified. In some examples, the determining a second accuracy score associated with the one or more second models includes determining accuracy scores for each model of the one or more second model based on the truth data. In some examples, the second accuracy score is larger than the first accuracy score if an accuracy score of each model of the one or more second models is larger than an accuracy score of each model of the one or more first models.

According to certain embodiments, a non-transitory computer readable storage medium storing one or more programs. The one or more programs includes instructions, when executed by one or more processors, causing a system for adaptive training of a machine learning system configured to predict answers to questions associated with textual data to perform receiving predicted answers to questions associated with textual data. The predicted answers are generated based at least in part on one or more first models of a machine learning system. The one or more first models are associated with a first accuracy score. The instructions, when executed by the one or more processors, cause the system to further perform determining based at least in part on a quality control parameter whether an evaluation of the questions by one or more external entities is required. In response to determining based at least in part on the quality control parameter that an evaluation of the questions by one or more external entities is required, the questions associated with the textual data and the textual data are sent to the one or more external entities for evaluation. The instructions, when executed by the one or more processors, cause the system to further perform receiving true answers to the questions from the one or more external entities and determining one or more accuracy parameters based at least in part on the true answers and the predicted answers. In response to the one or more accuracy parameters being smaller than a predetermined minimum threshold, an accuracy degradation event is identified, and the quality control parameter is increased. In response to a truth counter of at least one question being larger than a first predetermined truth threshold, one or more second models are generated, and a second accuracy score associated with the one or more second models is determined. In response to the second accuracy score being larger than the first accuracy score associated with the one or more first models, the one or more first models are replaced with the one or more second models at the machine learning system. For example, the system is implemented according to at least FIG. 1, FIG. 2, and/or FIG. 3.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for adaptive training of a machine learning system configured to predict answers to questions associated with textual data, the method comprising:
   receiving predicted answers to questions associated with textual data, the predicted answers being generated based at least in part on one or more first models of a machine learning system, the one or more first models being associated with a first accuracy score;
   receiving true answers to the questions from the one or more external entities;
   determining one or more accuracy parameters based at least in part on the true answers and the predicted answers;
   in response to a truth counter of at least one question being larger than a first predetermined truth threshold:
   generating one or more second models; and
   determining a second accuracy score associated with the one or more second models; and
   in response to the second accuracy score being larger than the first accuracy score associated with the one or more first models, replacing, at the machine learning system, the one or more first models with the one or more second models.

2. The method of claim 1 wherein the generating one or more second models includes training the one or more second models based at least in part on one or more combinations of truth data, the truth data including the true answers and the textual data associated with the true answers.

3. The method of claim 1 wherein the second accuracy score is larger than the first accuracy score if an accuracy score of each model of the one or more second models is larger than an accuracy score of each model of the one or more first models.

4. The method of claim 1, and further comprising:
   in response to the second accuracy score being smaller than or equal to the first accuracy score, waiting for the truth counter to increase further; and
   in response to the truth counter being larger than a second predetermined truth threshold:
   generating the one or more second models; and
   determining the second accuracy score associated with the one or more second models.

5. The method of claim 1, and further comprising:
   in response to the one or more accuracy parameters being equal to or larger than the predetermined minimum threshold, clearing the accuracy degradation event.

6. The method of claim 1 wherein the predicted answers to questions associated with textual data are received in response to a request or push event.

7. The method of claim 1 wherein the receiving true answers to the questions from the one or more external entities includes evaluating the questions based on the textual data by the one or more external entities through a mechanical evaluation, a virtual evaluation, or a natural evaluation.

8. The method of claim 7 wherein the questions based on the textual data are evaluated by the one or more external entities without knowledge of the predicted answers.

9. The method of claim 1, and further comprising:
storing the determined one or more accuracy parameters in a storage for retrieval by the machine learning system.

10. The method of claim 9, and further comprising:
storing an accuracy deviation in the storage for retrieval by the machine learning system, the accuracy deviation being equal to a difference of the one or more accuracy parameters and the predetermined minimum threshold.

11. The method of claim 1, and further comprising:
in response to the accuracy degradation event being cleared:
    determining an evaluation number, the evaluation number indicating a number of evaluations performed by one or more external entities from a time when the accuracy degradation event is identified; and
    storing the evaluation number and the truth counter in a storage for retrieval by the machine learning system.

12. The method of claim 11, and further comprising:
changing the first predetermined truth threshold based on the stored evaluation number.

13. The method of claim 1, and further comprising:
in response to the identifying an accuracy degradation event, storing the truth counter in a storage for retrieval by the machine learning system.

14. The method of claim 1, and further comprising:
increasing the predetermined minimum threshold in response to the first accuracy score increasing over time.

15. A system for adaptive training of a machine learning system configured to predict answers to questions associated with textual data, the system comprising:
one or more processors; and
a memory storing instructions, the instructions, when executed by the one or more processors, causing the system to perform:
    receiving predicted answers to questions associated with textual data, the predicted answers being generated based at least in part on one or more first models of a machine learning system, the one or more first models being associated with a first accuracy score;
    receiving true answers to the questions from the one or more external entities;
    determining one or more accuracy parameters based at least in part on the true answers and the predicted answers;
    in response to a truth counter of at least one question being larger than a first predetermined truth threshold:
        generating one or more second models; and
        determining a second accuracy score associated with the one or more second models; and
    in response to the second accuracy score being larger than the first accuracy score associated with the one or more first models, replacing, at the machine learning system, the one or more first models with the one or more second models.

16. The system of claim 15 wherein the generating one or more second models includes training the one or more second models based at least in part on one or more combinations of truth data, the truth data including the true answers and the textual data associated with the true answers.

17. The system of claim 16 wherein the one or more combinations of truth data include truth data generated after the accuracy degradation event is identified.

18. The system of claim 16 wherein the determining a second accuracy score associated with the one or more second models includes determining accuracy scores for each model of the one or more second models based on the truth data.

19. The system of claim 18 wherein the second accuracy score is larger than the first accuracy score if an accuracy score of each model of the one or more second models is larger than an accuracy score of each model of the one or more first models.

20. A non-transitory computer readable storage medium storing one or more programs, the one or more programs comprising instructions, when executed by one or more processors, causing a system for adaptive training of a machine learning system configured to predict answers to questions associated with textual data to perform:
receiving predicted answers to questions associated with textual data, the predicted answers being generated based at least in part on one or more first models of a machine learning system, the one or more first models being associated with a first accuracy score;
receiving true answers to the questions from the one or more external entities;
determining one or more accuracy parameters based at least in part on the true answers and the predicted answers;
in response to a truth counter of at least one question being larger than a first predetermined truth threshold:
    generating one or more second models; and
    determining a second accuracy score associated with the one or more second models; and
in response to the second accuracy score being larger than the first accuracy score associated with the one or more first models, replacing, at the machine learning system, the one or more first models with the one or more second models.

* * * * *